Jan. 23, 1951     J. G. OETZEL ET AL     2,538,796
CONTROL FOR VEHICLE BRAKING SYSTEMS

Filed Dec. 31, 1947     4 Sheets-Sheet 1

INVENTOR
John George Oetzel
James A. Mason
By Carlsen, Pitzner, Hubbard & Wolfe
ATTORNEY

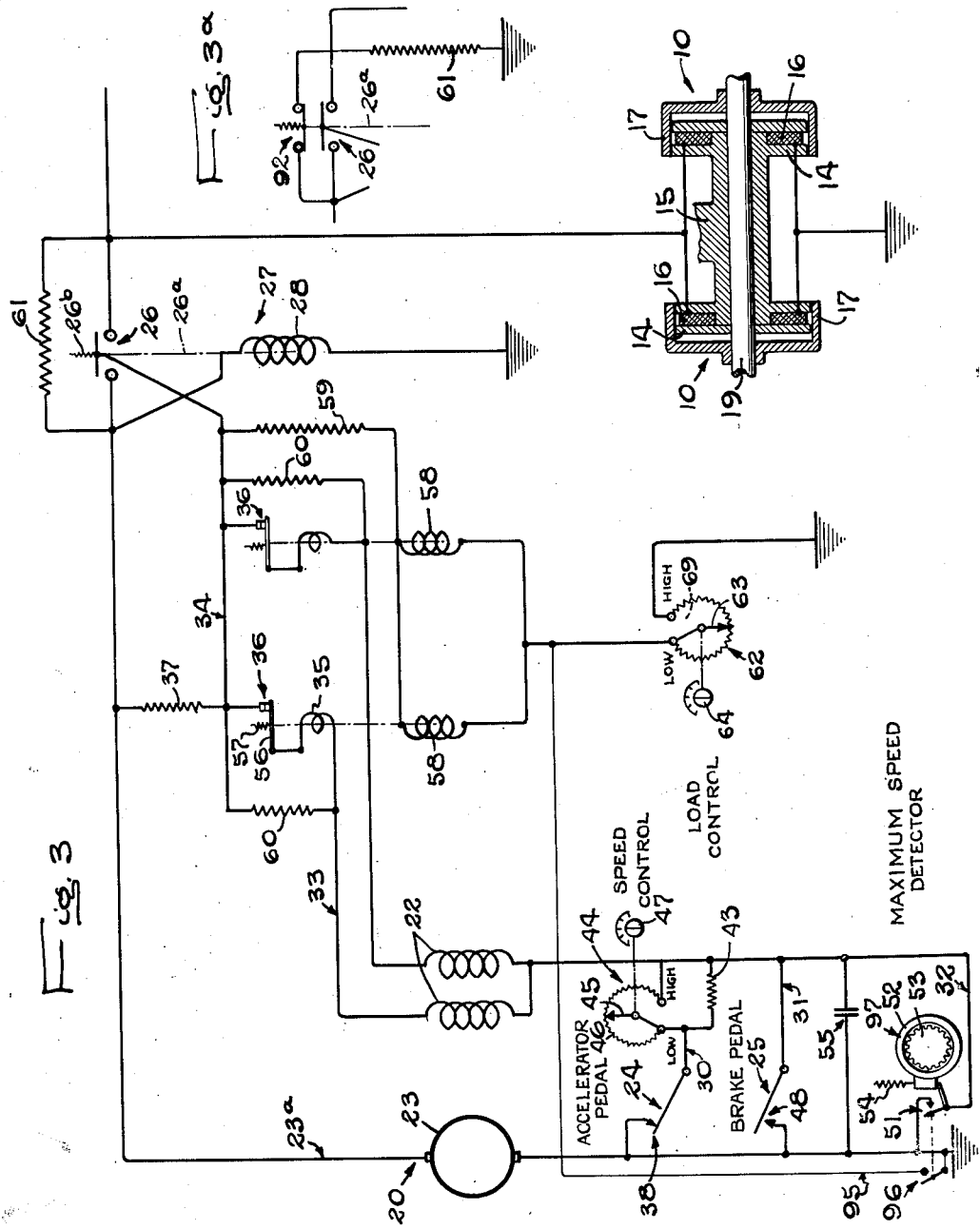

Jan. 23, 1951   J. G. OETZEL ET AL   2,538,796
CONTROL FOR VEHICLE BRAKING SYSTEMS
Filed Dec. 31, 1947                               4 Sheets-Sheet 3
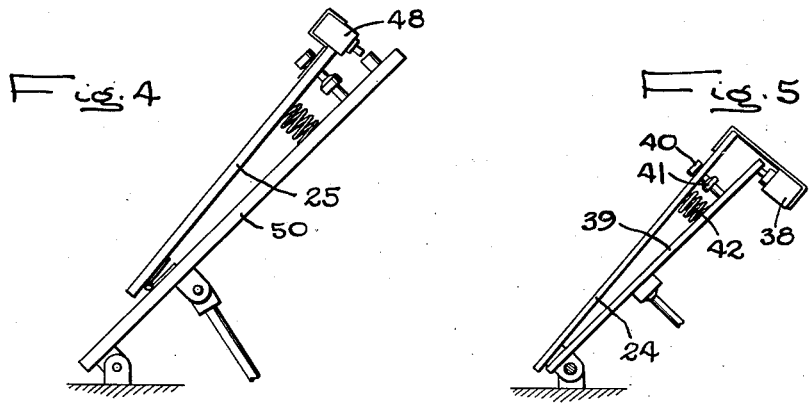
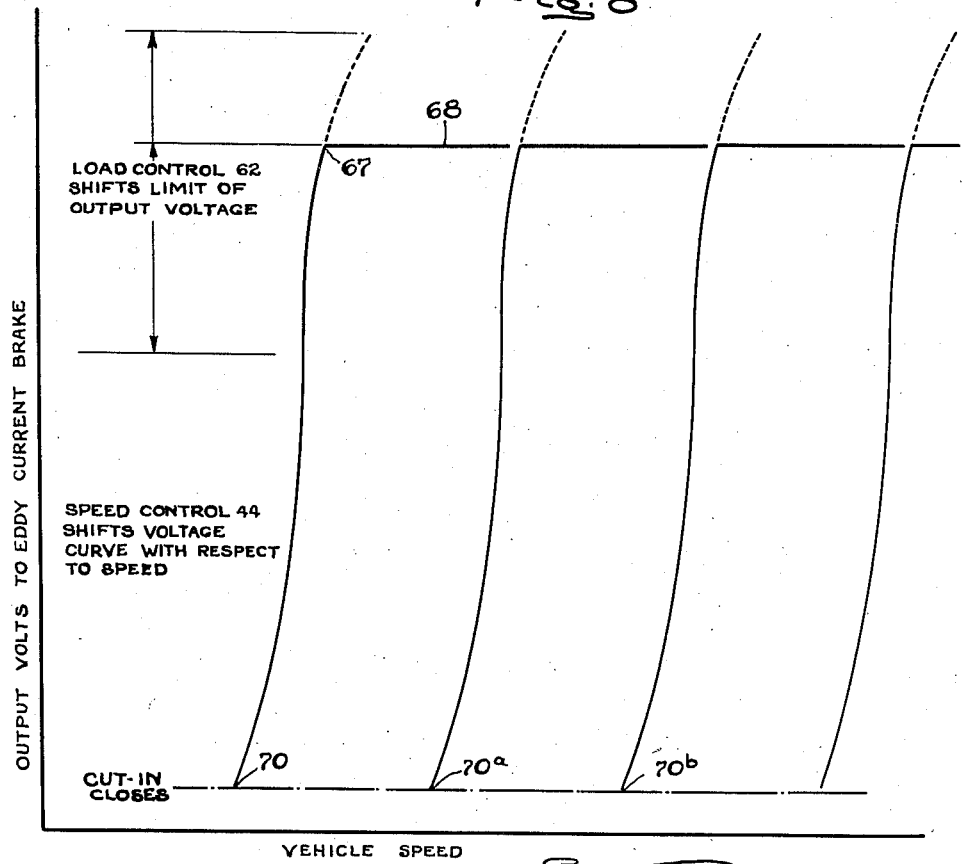
INVENTOR
John George Oetzel
James A. Mason
ATTORNEY Patented Jan. 23, 1951

2,538,796

UNITED STATES PATENT OFFICE 2,538,796

CONTROL FOR VEHICLE BRAKING SYSTEMS

John George Oetzel and James A. Mason, Beloit, Wis., assignors to Warner Electric Brake & Clutch Company, a corporation of Illinois Application December 31, 1947, Serial No. 794,998

22 Claims. (Cl. 192—3)

This invention relates to a control for governing the automatic energization of electrodynamic brakes on an automotive vehicle, being an improvement on the braking system disclosed in Patent No. 2,395,904.

The general object of the invention is to produce a braking system which provides for optimum safety of operation of heavy duty vehicles under all of the widely varying conditions encountered in service, which minimizes wear and tear on the vehicle power plant and the regular friction brakes, and which reduces driving fatigue.

A more detailed object is to regulate the output of a vehicle driven generator and the application of the output to the electrodynamic brake in response to the normal manual control of the accelerator and friction brake controller of the vehicle.

A further object is to provide for energization of the electrodynamic brake to a greater degree in response to application of the vehicle friction brakes whereby to utilize the electrodynamic brake to best advantage in minimizing wear on the friction brakes.

Still a further object is to enable the degree of energization of the electrodynamic brake to be adjusted independently of the speed at which initial energization occurs.

Another object of the invention is to provide novel means for variably controlling the output of a generator supplying an electrodynamic vehicle brake so that the initially applied energizing current is a function of the vehicle speed.

A further object is to provide a control for an electrodynamic brake which enables the vehicle speed at which the brake is first energized to be adjusted and in which voltage applied to the brake at the instant of cut in is substantially independent of the adjusted cut-in speed.

Still another object is to control the electrodynamic brake in a manner to prevent hazardous speeding up of the vehicle on a downgrade.

The invention also resides in the novel and simple manner of controlling and applying the output of vehicle driven generator so as to insure accuracy and reliability of operation of the electrodynamic brake throughout long periods of service use.

Other objects and advantages of the invention will become apparent from the following description, taken in connection with the accompanying drawings, in which:

Fig. 3 is a similar view of the preferred form of the brake control.

Fig. 3ª is a fragmentary view of a modification of the cricuit shown in Fig. 3.

Figs. 4 and 5 are side elevational views of the friction brake and accelerator pedals of the vehicle.

Figure 6:
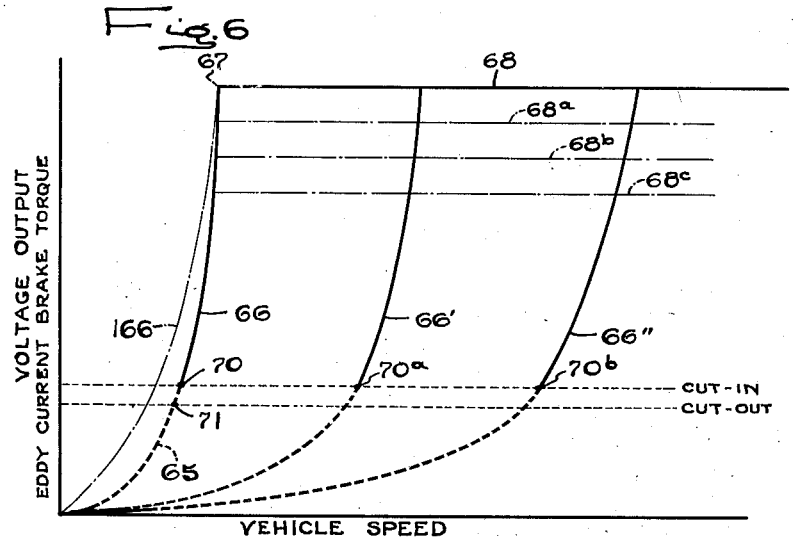

Fig. 6 shows typical speed versus brake torque curves obtained with the circuit shown in Fig. 3.

Figure 7:
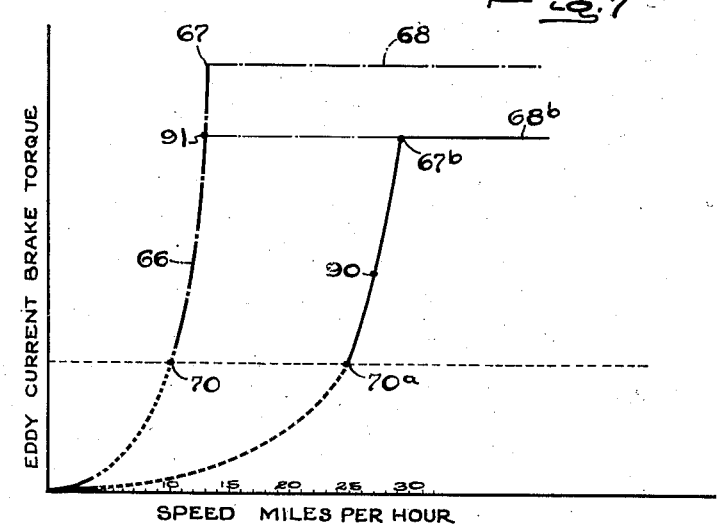

Fig. 7 shows another speed versus braking torque curve.

Figure 2:
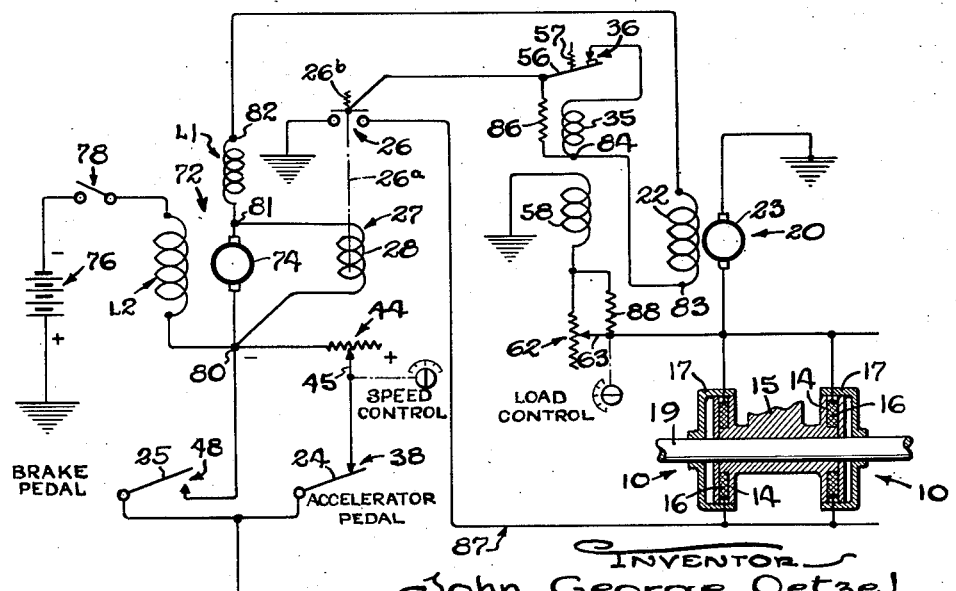
Fig. 2 is a schematic view and wiring diagram of one form of the brake control system.

Fig. 8 shows typical speed versus braking torque curves obtained with the control circuit shown in Fig. 2.

While the invention is susceptible of various modifications and alternative constructions, we have shown in the drawings and will herein describe in detail the preferred embodiments. It is to be understood, however, that we do not intend to limit the invention by such disclosure, but aim to cover all modifications and alternative constructions falling within the spirit and scope of the invention as expressed in the appended claims.

For purposes of illustration, the invention has been shown as applied to the control of an auxiliary brake 10 acting on the axles of a truck or tractor 11 driven by an internal combustion engine 13. The brake is of the well known eddy current type comprising nonrotatable toothed magnetic cores 14 adapted to be fixed to the axle housing 15 or other nonrotatable parts of the vehicle and having a winding 16. The magnetic poles of the cores coact with flanges or drums 17 composed of cast iron, steel, or "Armco" iron, preferably the latter, and driven in unison with the vehicle axles as by being fast on the propeller shaft 19. When the winding 16 is energized, flux threads the circuit around the winding including the drums 17 creating eddy currents in the latter. A retarding effect is thus exerted on the vehicle axle, the magnitude of this effect being proportional to the vehicle speed and the magnitude of the current energizing the brake windings 16. Although the eddy current type of brakes are well suited to the control to be described, the other types of electrodynamic brakes in which the braking torque is approximately proportional to the magnitude of applied voltage may also be used.

Preferably the current for energizing the electrodynamic brakes is derived from a generator 20 driven in unison with the vehicle motion. The generator may be mounted on the vehicle frame and diven by a belt 21 or the like from the propeller shaft 19. It is desirable to employ a generator whose output voltage increases rapidly as the vehicle speed increases above a predetermined cut-in speed below which the generator is disabled. While series or compound generators may be employed, a shunt type generator such as is commonly used for charging the batteries of automotive vehicles is preferred. Such generators are self-excited by residual magnetism and for the present purpose preferably have a split field formed by two windings 22 connected in parallel with each other with the pair shunted across the armature 23, one terminal of which may be grounded.

Generally stated, the invention contemplates timing the energization and deenergization of the auxiliary brakes 10 in accordance with certain functions performed by the driver in the normal operation of the vehicle including manipulation of the throttle or accelerator 24 by which the vehicle speed is controlled or the controller or a pedal 25 by which the regular friction brakes 49 of the vehicle are applied. The degree of such energization is determined by adjustments made selectively by the vehicle driver to correlate the auxiliary braking action with traffic conditions, the contour of the road being traversed by the vehicle, the condition of the road surface, and the load being carried.

The output of the generator is applied to the electrodynamic brakes by connecting the ungrounded terminal of the generator armature 23 and the brake windings 16 through a conductor 23ª and a switch 26 which is opened automatically when the delivered voltage falls below a predetermined low value whereby to prevent the voltage generated as a result of residual magnetism from effectually energizing the eddy current brakes and thereby producing a continuous drag on the vehicle. The movable contacts of the switch 26 are carried by the armature 26ª of a cut-in relay 27 whose winding 28 is connected across the generator armature 23 so as to be responsive to the output voltage at all times. A spring 26ᵇ biases the armature in a direction to open the switch which becomes closed when the voltage applied to the coil 28 reaches a predetermined low value.

The generator 20 is rendered effective to deliver current for energizing the brakes 10 by closing the generator field circuit which, in the present instance, has three branches 30, 31 and 32 interposed in parallel between the grounded terminal of the armature 23 and the common terminal of the two windings 22. The other terminal of each winding extends through a conductor 33, a magnetic coil 35, a switch 36 and a conductor 34 which is connected to the armature terminal 23ª either through a resistor 37 or through the cut-in switch 26 when the latter is closed.

The branch 30 of the field circuit includes a switch 38 which is open when the accelerator pedal 24 is released completely and closed only when foot pressure is applied to the pedal. To this end, the accelerator pedal operates through an auxiliary pedal 39 (Fig. 5) which has a short lost motion connection determined by stops 40 and 41 with the accelerator proper and tends to separate from the latter under the action of a spring 42 and is depressed after a short motion of the pedal 24 sufficient to open the switch 38. Thus, when the pedal 24 is fully released as shown in Fig. 5, the switch 38 is closed but whenever the vehicle driver's foot is resting on the pedal 24 or is depressing the latter, the switch 38 will be opened and the branch circuits will be held open.

The branch circuit 30 also includes a fixed resistance 43 and a regulator 44 selectively adjustable to vary the voltage generated at a given vehicle speed. Herein the regulator is a rheostat having a slider 45 movable across a resistance element 46 by turning a knob 47 located within convenient reach of the vehicle driver. As the slider is turned counterclockwise and clockwise, the resistance of the field circuit through the accelerator pedal switch 38 will be increased and decreased respectively.

The second branch circuit 31 by which the generator may be rendered operative to energize the eddy current brakes 10 includes a switch 48 which is actuated by movement of the pedal 25 by which the regular friction brakes 49 (Fig. 1) are applied hydraulically, electrically or mechanically. When the pedal is fully released (Fig. 4), the switch 48 is open. As pressure is applied, the pedal movement closes the switch and, after a short movement, encounters an auxiliary pedal 50 which is depressed under further foot pressure to apply the friction brakes 49. Except for the reverse action of the switch, the pedal construction and action are the same as in the case of the accelerator above described.

The third branch 32 of the field circuit includes a switch 51 which is open during operation of the vehicle at normal speeds but is closed when the vehicle exceeds a predetermined maximum speed which is only slightly above the speed at which the regular engine governor becomes effective to disable the accelerator and prevent the driver from speeding up the engine further. Any desired speed sensing device acting centrifugally or otherwise to close the switch 51 may be employed. Thus, the device, indicated at 97, may comprise a non-magnetic metallic drum 52 driven from the shaft of the generator 20 and disposed opposite poles on a permanent magnet ring 53 angularly biased by a spring 54 in a direction to open the switch 51. When the vehicle is moving at or above a selected maximum as determined by adjustment of the spring tension, the latter is overcome and the switch is closed to complete the generator field circuit. As the vehicle speed falls the switch 51 is again allowed to open.

A condenser 55 is shunted across each of the control switches 38, 48, and 51 to minimize burning off of the contact surfaces.

Provision is made for limiting the voltage delivered by the generator to a predetermined maximum which will avoid overheating of the generator or the eddy current brakes at excessive vehicle speeds. While such limiting action may be obtained in various ways, it is accomplished herein by a regulator of the so-called vibrating relay type, there being one regulator for each of the field windings 22.

Each regulator includes one of the switches 36 whose movable contact is carried by an armature 56 biased to close by a light spring 57 and opened by the associated magnetic coil 35 in the generator field circuit and an associated coil 58 having a larger number of turns and interposed in a separate circuit which extends across the generator armature when the cut-in switch 26 is closed.

Herein, the circuit extends from movable contact of the cut-in switch through a ballast resistor 59, both of the coils 58 connected in parallel, and a voltage regulator or rheostat 62.

The coil 35 is arranged to oppose the magnetic effect of the coil 58 but its bucking force is considerably less than the attractive force of the coil 58. When the regulator circuit is closed, current will flow in both coils 35 and 58 until the magnetic attraction of the latter coil builds up sufficiently to overcome the spring and the force of the coil 35 whereupon the switch 36 is opened. Thereupon, the coil 35 is deenergized so that the increased resultant magnetic force of the coil 58 alone holds the switch open until the generated voltage has decreased to a lower value at which the switch is allowed to close again rendering both coils active. With the bucking coil 35 again effective, the voltage applied to the coil 58 must rise to the higher value before the switch 36 is again opened. In this way, the bucking coil imparts a substantial voltage differential to the regulator thereby reducing the frequency of opening and closing the switch 36. As a result of the switch actuation, the flow of current in the generator field circuit and therefore the voltage produced by the generator is limited to a value determined by the resistance of the circuit through the regulator coils 58. That is to say, as the resistance of this circuit is reduced, a correspondingly lesser voltage is required in order to open the vibrator switch 36. The switch then vibrates to reduce the average energization of the generator field and maintain a lower output voltage across the generator armature. Conversely, as the resistance of the circuit energizing the coils 58 is increased, a higher voltage will be required to produce the energizing current necessary for opening the switches 36. As a result, the generated voltage is increased.

By splitting the generator field windings into two parts and energizing each winding through a separate vibrator switch 36, the burden on the latter is reduced and the service life is prolonged. A resistance 60 is connected across each switch 36 so that the circuit through the associated field winding 22 is not interrupted when the vibrator switch opens. Thus, when the switch is open, the current flow through the field winding is merely reduced. This also minimizes burning of the switch contacts.

Advantage is taken of the characteristics of the voltage limiting device above described to provide a simple means for manually adjusting the maximum energization of the eddy current brakes 10 so that the latter may be adapted readily to the prevailing road and load conditions. For this purpose, the rheostat 62 is interposed in series with the coils 58 so that the resistance of the circuit therethrough may be increased or decreased by turning the slider 63 clockwise and counterclockwise respectively. For the reasons mentioned above, an increase in the resistance results in an increase in the limit voltage of the generator while a corresponding decrease in the maximum voltage results from adjustment of the rheostat to decrease the circuit resistance. Such adjustment may be effected by turning a knob 64 which is located on the vehicle dash so as to be readily accessible to the driver.

For a reason to appear later, a resistor 61 is shunted directly across the cut-in switch 26 so as to be included in the generator armature circuit when the cut-in switch is open. This resistance is substantially greater than the resistance of the brake windings 16 for example, 6.25 ohms as compared to .75 of an ohm.

The generator and associated controls described above produce a voltage versus vehicle speed characteristic as shown in Fig. 6. Thus, with the rheostat 62 adjusted to cause the voltage regulator to produce the highest generator output voltage (the slider 63 being positioned along the dotted line 69, Fig. 3), the output voltage would, if the generator field circuit is closed, increase with the vehicle speed along the line 65, the initial field circuit extending through the resistance 37. When the output voltage has increased sufficiently to energize the cut-in relay coil 28 and close the switch 26, the field circuit is closed around the resistance 37 and through the switch 26 so that the voltage is applied to energize the brake windings 17, the point of such cut-in being indicated at 70.

Now, as the vehicle speed is increased, the generator voltage and therefore the retarding torque exerted by the brakes 10 increases abruptly along the line 66. Thus, with a compartively small increase in the vehicle speed, the output attains its maximum value 67 as determined by the vibrating voltage regulator. This value is maintained substantially constant as indicated at 68 during a further increase in the vehicle speed beyond the point 67. As the vehicle speed decreases below this point, the generated voltage and therefore the retarding torque follows down substantially along the curve 66 until the coil becomes sufficiently deenergized as indicated at 71 to release its armature and allow the switch 26 to open. At this time, the eddy current brakes are disabled and further drag on the vehicle is prevented as the output voltage continues downwardly along the curve 65.

As described above, the effect of decreasing the resistance of the vibrating relay circuit is to lower the limiting voltage delivered by the generator. Thus, by turning the slider 63 clockwise, the line 68 of the characteristic curve Fig. 6 is lowered progressively so that the voltage limit may be reduced to any desired value such for example as indicated by the lines 68ª, 68ᵇ, and 68ᶜ. Such reduction in the generator voltage produces corresponding limits in the retarding torque exerted by the eddy current brakes 10. This is advantageous in enabling the retarding effect produced by the eddy current brakes to be adjusted to suit road and load conditions. Thus, when the vehicle is traveling either empty or loaded on dry roads, the full capacity of the eddy current brakes may be utilized and the rheostat slider 63 would then be set near the position 69 to produce the maximum safe voltage and retarding torque. If the road surface is icy, it would be desirable, in order to avoid the danger of vehicle skidding, to reduce the maximum voltage capable of being applied to the auxiliary brakes. Thus, the slider 63 would be turned clockwise to a position corresponding to the load being transported. If the vehicle were empty, it might be necessary on icy roads to reduce the resistance of the rheostat to a minimum and limit the generated voltage to a minimum value. As a result, the operation of the auxiliary brakes may be varied selectively to suit the widely varying conditions of load and road surface required in order to achieve optimum safety in the operation of the vehicle.

When the eddy current brakes 10 are energized under the emergency condition which results in closure of the generator field circuit by the maximum speed detecting switch 51, it is desirable to disable the load controller 62 and thereby prevent the vehicle driver from reducing the effectiveness of the brakes 10 by adjustment of this controller. To this end, the grounded ends of the coils 58 are connected to a conductor 95 which extends to the grounded side of the armature 23 through a switch 96 built into the speed detector 97 and actuated by the latter so as to be normally open but closed at the same time as the switch 51.

Because the voltage output of the generator 20 is a function of both the speed of the vehicle and also the degree of energization of the field circuit, the generator 20, acting in conjunction with the cut-in relay 27, may be utilized advantageously to adapt the auxiliary brakes to suit various traffic conditions. This is accomplished by interposing the rheostat 44 in the field circuit of the generator through the accelerator controlled switch 38 so that by adjusting this rheostat the vehicle speed at which the auxiliary brakes 10 are cut in may be varied as desired. That is to say, the position of the part 66 of the voltage-speed curve (Fig. 6) may be shifted back and forth horizontally by adjusting the slider 45. In the low limit position of the latter, the resistance of the field circuit will be a minimum and therefore the generated voltage will build up to the cut-in value at the lowest vehicle speed as indicated at 70. Now, if by adjustment of the slider 45, the field resistance is increased, a greater speed of the vehicle must be achieved before the cut-in switch 26 is closed by its coil 28. Thus, the curve 66 may, by turning the slider 45 counterclockwise from the position of minimum resistance, be shifted to the right as indicated at 66' and 66'' in Fig. 6 so that the vehicle speed at which the brakes 10 are cut-in as indicated at 70ª or 70ᵇ will be increased.

To enable the eddy current brake control to be adapted to all of the widely varying conditions encountered in service, it is desirable that the speed control adjustment by the rheostat 44 be effective over a wide range of vehicle speeds. That is to say, the cut-in point 70 should be shiftable as desired over a speed range of from 10 to 40 miles per hour for example. The resistance 61 connected as described above affords one way of achieving this end. Such a high resistance in series with the generator armature causes a substantial armature reaction and this results in delaying the voltage build up to the cut-in value until a higher vehicle speed is attained. That is to say, the point 70 on the curve 66 is shifted farther to the right than would be the case if the resistance 61 were omitted. The resistance does not, however, change the horizontal position of the upper end of the curve 66 so that the generator attains the maximum voltage (point 67) at the same vehicle speed. In other words, the resistance 61 operates to flatten or reduce the horizontal dimension of the curve 66 (Fig. 6) which would be produced if the resistance were omitted.

If desired, the initial circuit through the armature and the resistance 61 may be extended directly to ground instead of through the brake windings 16. This may be accomplished as shown in Fig. 3ª by providing a second switch 92 which is actuated by the movement of the armature 26ª of the cut-in relay 27, this switch being closed and opened when the cut-in switch is opened and closed respectively. One terminal is connected to the conductor 25ª short of the cut-in switch 26 while the other terminal is grounded through the resistance 61. With this arrangement the small voltage delivered by the generator 20 as a result of the residual flux when the field circuit is interrupted, is never applied to the brake windings 16.

In accordance with the foregoing, the rheostat 44 is adjusted to suit prevailing traffic conditions. If, for example, the vehicle is traveling in city traffic where a minimum of coasting is desired, it is desirable to have the auxiliary brakes become effective at the lowest possible vehicle speed whenever the accelerator pedal is released completely. For this purpose, the rheostat would be adjusted to the position of minimum resistance so as to cut-in the brakes at the point 70. On the other hand, if the vehicle is traveling in the country over hilly terrain, an intermediate setting of the rheostat would be desirable so that the auxiliary brakes would be energized on release of the accelerator at moderate speeds. In such a case, the auxiliary brakes would not be energized below the speeds ordinarily considered safe for coasting down moderate grades but at the same time would be available to avoid excessive speeds on steeper grades. In the case of level country where a substantial amount of coasting is desirable in order to conserve fuel, an even greater increase in the resistance of the generator field control circuit would be permissible.

The resistance 37 is included in the initially closed circuit through the generator field in order to prevent any danger of fluttering of the cut-in relay switch 26. It will be observed that this resistance is short-circuited as soon as the cut-in switch is closed following a rise in the generator voltage along the curve 65 to the point 70 at which time the resistance load of the brake windings 16 is imposed on the generator. Such a load results in a slight drop in the output voltage of the generator but this is compensated for by the decreased resistance of the field circuit due to short-circuiting of the resistance 37. As a result, the generated voltage is prevented from falling below the point 71 or the differential of the cut-in relay 27 and any danger of this relay reopening the switch 26 is avoided.

Figure 1:
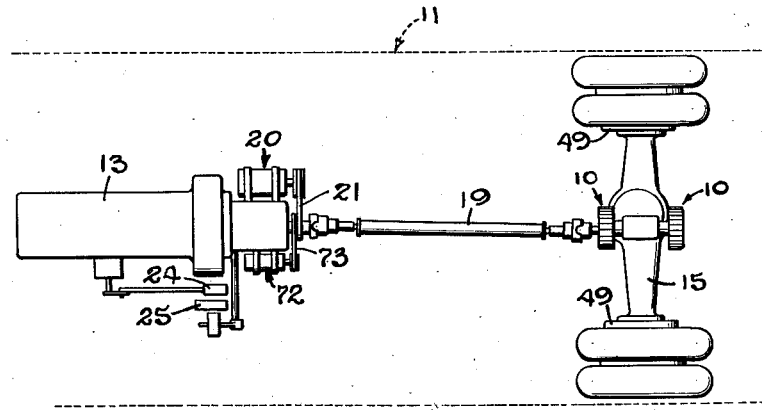
Figure 1 is a plan view of the wheel and axle assemblies and the power plant of a truck equipped with a braking system embodying the present invention, the truck body being shown in phantom.

Substantially, the same generator and circuit characteristics may be obtained by utilizing an auxiliary direct current generator 72 for exciting the field of the main generator 20 and associated with circuit controlling apparatus as shown in Fig. 2 in which the principal parts corresponding to those already described are indicated by corresponding reference numerals. The auxiliary generator may be relatively small and mounted on the vehicle as shown in Fig. 1 to be driven by a belt 73 from the propeller shaft. As shown, the generator has an armature 74, a separately excited field $L_2$ and a series field $L_1$, the latter being connected to produce a cumulatively compounded effect although sufficient armature reaction should be present in the generator to prevent build-up of current from a low residual value. The armature reaction should also act to prevent the armature current from building up excessively. The circuit of the shunt winding $L_2$ includes a battery or similar source of direct voltage 76 and a switch 78 for manually cutting off current flow through the shunt winding under standby conditions.

The shunt winding $L_2$ is connected to a terminal 80 of the exciter generator armature 74, which is grounded through the speed control rheostat or variable resistor 44, and the switch 38 operated by the accelerator pedal 24. The speed control rheostat 44 and the accelerator switch 38 are by-passed by the normally open switch 48 associated with the brake pedal 25. Closure of the switch 48 by application of pressure to the brake pedal has the effect of reducing the electrical resistance between terminal 80 and ground to zero thereby causing a maximum current to flow through the shunt winding $L_2$ of the auxiliary generator.

Connected across the armature 74 of the exciter generator 72 between terminal 80 and the opposite armature terminal 81 is the winding 28 of the cut-in relay 27. As in the form previously described, this winding is thus energized by a voltage which is both a function of the current flowing in the field winding $L_2$ and the speed of rotation of the armature 74. When the generated voltage exceeds a predetermined magnitude, the armature of the coil 28 will be drawn downwardly against the upward biasing force of a spring to close the switch 26 which connects the eddy current brake windings 16 to the generating system.

Operative connection of the exciter generator 72 and the main generator 20 is effected by joining a terminal 82 of the exciter generator series winding $L_1$ to a terminal of a field winding 22 in the main generator. A companion terminal 83 of the field winding 22 is connected to a terminal 84 of the current winding 35 of the vibratory voltage regulator. From the remaining end of the current winding, the circuit includes a pair of normally closed contacts which form the switch 36 and are controlled by the movable armature 56 normally retained in the upward position by the biasing spring 57. The generator field circuit is completed through an electrical connection between the normally closed contacts of the voltage regulator switch 36 and the armature 56 of the cut-in relay switch 26, this armature being grounded when the winding 28 of the cutout is sufficiently energized to close its switch.

It will be seen that the armature of the auxiliary generator 72 is connected in series with the main field winding 22 through a circuit extending through the accelerator pedal switch 38, rheostat 44, armature 74, series winding $L_1$, field winding 22, current winding 35, contacts 36, armature 56, contact 26ª, and a ground return. A portion of this circuit including the contacts 36 and the current winding 35 is shunted by a resistor 86 which completes the circuit when the switch 36 is open.

Current is supplied to the winding 16 of the eddy current brake from the armature 23 of the main generator 20. One terminal of the armature is connected to ground while the other terminal is connected to the winding of the brake. The circuit from the brake is completed through a conductor 87, the switch 26 to ground when the cut-in relay 27 is in the closed position. The output voltage of the main generator is applied to the voltage winding 58 of the voltage regulator through a series resistor 88. The rheostat or variable resistor 62 shunts the resistor 88 and serves to control the maximum torque which may be exerted by the brake in the manner previously described in connection with the circuit shown in Fig. 3. As before, the windings 35 and 58 of the voltage limiting regulator are in the field and across the armature of the main generator 20 but the vibrating switch 36 is interposed in series with both the series field $L_1$ of the auxiliary generator 72 and the field 22 of the primary shunt generator 20.

The curve (Fig. 8) shows the approximate relationship of the vehicle speed and the voltage delivered to the eddy current brakes 10 when the vehicle driven generator 20 is controlled by the circuit shown in Fig. 2. The shape of the curve 66 is essentially the same as in the case of the circuit first described and the various parts of the curve are numbered correspondingly.

*Operation*

The operation of the entire brake control system will now be described, it being assumed that the speed and load control regulators 44 and 62 are adjusted to produce the curve shown in full in Fig. 7. Such adjustment might be employed when the vehicle while partially loaded is traveling in rolling country on a pavement on which full energization of the brakes 10 to the limit 68 might be dangerous. Thus, the load controller 62 will act to limit the maximum braking torque to a value 68ᵇ somewhat below the maximum value 68.

The speed controller 44 probably would be set to cause the brakes 10 to cut-in at 25 miles per hour as indicated at 70ª, the maximum torque limit being obtained at perhaps 27 miles per hour as indicated at 67ᵇ. If the regular speed limiting governor of the vehicle engine is set to disable the accelerator independently of the driver at a speed of 50 miles per hour, the speed sensing device 97 would be adjusted to close the switches 51 and 96 at a slightly higher speed, for example, 52 miles per hour.

During normal operation of the vehicle, the brake pedal 25 would be released and the accelerator pedal 24 would be depressed opening the switch 38 so that the generator field circuit would be interrupted and the voltage across the terminals of the generator armature would not be sufficient to cause the cut-in relay 27 to close its switch 26. As a result, the eddy current brakes would be maintained ineffectual.

Now assume that the vehicle reaches a long and steep downgrade whereupon the vehicle driver releases the accelerator pedal closing the switch 38 to complete the field circuit through the resistor 37. If, at this time, the vehicle speed is less than 25 miles per hour, the cut-in switch 26 would be held open, the eddy current brakes remaining ineffectual. When the cut-in speed of the coasting vehicle has been attained as indicated at 70ª (Fig. 7), the generator voltage will be sufficiently high to cause the cut-in relay 27 to close the switch 26 and connect the eddy current brakes 10 directly to the generator. These brakes thus become effective to assist the friction of the vehicle engine in limiting the coasting speed.

Assuming that the retarding torque thus applied is not sufficient to prevent further acceleration of the coasting vehicle, the voltage developed by the generator and therefore the braking torque developed will increase rapidly with the vehicle speed along the curve 66', the maximum retarding effect being achieved at a speed of 30 miles per hour as indicated at 67ᵇ. If the eddy current brakes are of proper capacity, the maximum torque thus applied will be sufficient to hold the vehicle on relatively steep downgrades. Therefore, the continued application of the maximum retarding torque 68ᵇ as determined by the adjustment of the load controller 62 should, under ordinary circumstances, prevent further acceleration of the vehicle and avoid the necessity of applying the friction brakes 49.

If, under the conditions above assumed, the vehicle driver does not release the accelerator pedal until a speed of say 27 miles per hour has been attained, the cut-in switch 26 will be closed immediately and the brakes 10 will be energized to produce a retarding torque as indicated at 90. On the other hand, if the vehicle is traveling at more than 30 miles per hour (point 67b) when the accelerator pedal is released, the maximum voltage indicated at 68b will be applied immediately to the eddy current brakes.

The control of the eddy current brakes thus far described takes place substantially automatically in response to the normal driving of a vehicle under conditions ordinarily encountered in open country. The necessity of applying the friction brakes 49 is virtually avoided even when vehicle is following a lighter passenger automobile. That is to say, the eddy current brakes will decelerate a heavy duty vehicle at a rate greater than the rate of deceleration of a passenger car by engine friction alone. As a result, the driver of the vehicle, when approaching a passenger car ahead will not have to apply his friction brakes in order to avoid over-running the passenger car even though the latter is coasting.

Whenever it becomes desirable, in order to conserve fuel, to coast the vehicle at speeds higher than the cut-in speed indicated at 70a, the driver may disable the eddy current brakes readily. He accomplishes this simply by resting his foot against the pedal 24 with a pressure sufficient to open the switch 38 but insufficient to overcome the spring 42 and move the accelerator proper.

If it becomes desirable to decelerate the vehicle at a rate greater than that at which the vehicle is being retarded by the eddy current brakes 10 with the accelerator pedal released, the driver will naturally apply the friction brakes 49 by depressing the brake pedal 25. As an incident to this, the switch 48 will be closed thereby shunting out the speed control rheostat 44 and causing the eddy current brakes to be energized to their full capacity 68b irrespective of the prevailing vehicle speed, provided that the latter is above the value indicated at 91 and determined by the intersection of the curve 66 and the line 68b. Thus, the torque developed by the brakes 10 in response to closure of the switch 38 by the brake pedal is independent of the speed controller 44 so as to become fully effective at the lowest possible vehicle speed. Nevertheless, the maximum torque is at this time subject to the setting of the load controller 62 so that energization of the eddy current brakes sufficiently to cause skidding of the vehicle on icy roads may be avoided by proper adjustment of the load controller 62 in accordance with existing load and road conditions.

With the brake pedal held depressed, the eddy current brakes 10 continue to operate at full torque until the vehicle has slowed down below a speed of approximately 12 miles per hour as indicated at 91. Thereafter, the torque decreases gradually along the curve 66 as the vehicle slows down further.

It will thus be apparent that whenever there is a need to apply the friction vehicle brakes, the eddy current brakes will be brought into play automatically and will share an optimum proportion of the retarding effort required to effect the rate of vehicle deceleration. This not only minimizes wear on the friction brakes but also reduces driver fatigue.

When an ordinary heavy duty vehicle is coasting down a hill, it is possible for the driver, by depressing the accelerator, to attain a speed greater than that for which the regular speed governor of the engine is set. In accordance with another aspect of the present invention, the eddy current brakes 10 are energized automatically to prevent such excessive speeding up of the vehicle. Thus, if the vehicle attains a speed of 52 miles per hour which is in excess of the ordinary engine governor setting, the switches 51 and 96 will be closed and the eddy current brakes will be energized to maximum capacity as indicated at 68. It will be observed that such energization is independent of both the speed control rheostat 44 and the load controller 62 so that it is impossible for the driver to operate the vehicle, even while coasting, above the prescribed speed.

From the foregoing, it will be apparent that the eddy current brakes 10 are energized virtually automatically as an incident to the normal operations performed by a vehicle driver and are brought into play to a degree suited to the character of the conditions prevailing. They are energized to the limit determined by the load control at the lowest possible vehicle speed whenever friction braking is required. Whenever the driver attempts to exceed a prescribed safe maximum speed, they are energized to the highest possible degree. Thus, the brakes 10 always contribute as large a part of the required retarding force as possible and thereby minimize wear and tear on the friction brakes. On the other hand, under more or less normal conditions of vehicle operation, the energization of the eddy current brakes is correlated with the vehicle speed. As a result, the adjustment may be such as to bring the brakes into action at low speed when the vehicle is operating in city traffic. Or, as described above, the energization of the brakes in response to release of the accelerator pedal may be delayed until a high vehicle speed has been attained.

This application is a continuation-in-part of our now abandoned application Serial No. 697,094, filed September 14, 1946.

We claim as our invention:

1. The combination of an electrodynamic brake for use in retarding a vehicle, an electric generator adapted to be driven in unison with the motion of said vehicle and having a field winding and an armature, means providing a circuit for energizing said winding including a switch and a resistance selectively adjustable to vary the strength of the generator field produced by closure of said switch, a cut-in switch adapted when closed to apply the output voltage of said generator to said brake, a relay responsive to the voltage drop across said armature and operable to close said cut-in switch when the voltage increases to a predetermined value following closure of said field circuit, a voltage regulator responsive to the voltage output of said generator and operable on said field circuit to vary the strength of the field intermittently and limit the voltage to a predetermined maximum value, said regulator including a magnetic coil connected across said armature, and a resistor in series with said coil and selectively adjustable to vary the voltage limiting action of the regulator.

2. The combination of an electrodynamic brake adapted for use in retarding the motion of a vehicle, an electric generator having a field winding, a cut-in switch adapted when closed to connect said generator to said brake to energize the latter, means providing an energizing circuit for said field winding including a switch for closing said circuit and a controller selectively operable to vary the strength of field resulting from closure of said field switch, a magnetic relay responsive to the voltage output of said generator and operable to close said cut-in switch when the voltage exceeds a predetermined useful value, and a regulator responsive to the generated voltage after closure of said cut-in switch and operable to vary the energization of said field circuit and limit the output voltage of said generator to a predetermined value higher than said cut-in value.

3. The combination of an electrodynamic brake adapted for use in retarding a vehicle, an electric generator for energizing said brake adapted to be driven in unison with the vehicle motion and having a field circuit with a field winding therein, a control switch and a variable resistor interposed in said circuit in series with said winding, a relay responsive to the output voltage delivered by said generator and having a switch normally open below a predetermined voltage value and closed when the voltage exceeds such value, said relay switch when closed applying the generator output to said brake and manually operable means by which said resistor may be adjusted whereby to vary the output voltage delivered by said generator at any given speed of said vehicle.

4. The combination of an electrodynamic brake adapted for use in retarding a vehicle, an electric generator adapted to be driven in unison with the vehicle motion and having a field winding, means providing an energizing circuit for said field winding including a control switch, means for applying the generator output to said brake including a cut-in switch, a relay responsive to the generated voltage and operable to close and open said cut-in switch respectively as the voltage rises above and falls below a predetermined low value, and a controller associated with said field circuit and selectively adjustable to vary the energization thereof when said control switch is closed whereby to change the speed of the vehicle at which said cut-in switch is closed by said relay.

5. The combination of an electrodynamic brake adapted for use in retarding a vehicle, an electric generator energizing said brake and having a voltage-speed characteristic curve which rises rapidly with increases in speed, means providing a circuit for energizing the field of said generator, a relay responsive to the voltage output of said generator and having a switch adapted to be closed above predetermined voltage whereby to apply the output of said generator to said brake, and a regulator associated with said field circuit and selectively adjustable to vary the strength of the generator field and thereby shift the position of said curve along the speed axis thereof.

6. The combination of an electrodynamic brake adapted for use in retarding a vehicle, an electric generator for energizing said brake adapted to be driven in unison with the vehicle motion, means including a control switch manually operable to render said generator effectual and ineffectual, a magnetic relay responsive to the voltage output of said generator and adapted to apply such output to said brake when the output exceeds a predetermined value and a regulator selectively adjustable to modify the voltage output of said generator at different vehicle speeds and thereby vary the vehicle speed at which said brake is energized effectually.

7. The combination of an electrodynamic brake having an energizing winding and adapted for use in retarding a vehicle, an electric generator adapted to be driven in unison with the vehicle and having a shunt field circuit, a relay responsive to the voltage delivered by said generator and having a switch adapted when closed to apply the generator output to said brake, said switch being held open by said relay at output voltages below a predetermined value and closed at voltages above such value, and a resistance having a value several times that of said brake winding and interposed in series with the armature of said generator when said switch is open but rendered ineffectual when the switch is closed.

8. The combination of an electrodynamic brake having an energizing winding and adapted for use in retarding a vehicle, an electric generator adapted to be driven in unison with the vehicle and having a shunt field circuit, a relay responsive to the voltage delivered by said generator and having a switch adapted when closed to apply the generator output to said brake, said switch being held open by said relay at output voltages below a predetermined value and closed at voltages above such value, and means rendered operative and inoperative automatically as an incident to opening and closing of said switch and operable when active to substantially increase the armature reaction of said generator.

9. For use on a vehicle having an accelerator manually movable away from a released position to increase the vehicle speed progressively and a controller manually movable away from a released position to apply the friction brakes of the vehicle, an auxiliary braking system having, in combination, an electrodynamic brake for retarding the vehicle, a generator adapted to be driven in unison with the vehicle motion and having a winding variably energizable to vary the generator output, means for applying the output of said generator to said electrodynamic brake including a first switch, means responsive to the output voltage of said generator for maintaining said switch closed and opened respectively when the output voltage is above and below a predetermined value, an energizing circuit for said generator winding including a normally open switch adapted to be closed in response to movement of said brake controller away from said released position, a branch circuit in parallel with said second switch and including in series a manually adjustable voltage changer and a third switch adapted to be closed when said accelerator is in said released position and opened when the accelerator is moved away from such position, a fourth switch normally open and interposed in parallel in said field circuit with said second switch, means by which said fourth switch may be closed when the vehicle exceeds a predetermined abnormally high speed and means responsive to changes in the voltage output of said generator and operable to modify the energization of said field circuit so as to limit the output voltage to a predetermined maximum value.

10. For use on a vehicle having an accelerator manually movable away from a released position to increase the vehicle speed progressively and a controller manually movable away from a released position to apply the friction brakes of the vehicle, an auxiliary braking system having, in combination, an electrodynamic brake for retarding the vehicle, a generator adapted to be driven in unison with the vehicle and having a winding variably energizable to vary the generator output, means for applying the output of said generator to said electrodynamic brake including a first switch, means responsive to the output voltage of said generator for maintaining said switch closed and opened respectively when the output voltage rises above and falls below a predetermined value, a circuit for controlling the energization of said generator winding including a normally open switch adapted to be closed in response to movement of said brake controller away from said released position, a second circuit for controlling the energization of said winding including in series a manually adjustable changer and a third switch adapted to be closed when said accelerator is in said released position and opened when the accelerator is moved away from such position, and means responsive to the voltage output of said generator and acting to modify the energization of both of said circuits and limit the generated voltage to a predetermined maximum value.

11. For use on a vehicle having an accelerator manually movable away from a released position to increase the vehicle speed progressively and a controller manually movable away from a released position to apply the friction brakes of the vehicle, an auxiliary braking system having, in combination, an electrodynamic brake for retarding said vehicle, a generator adapted to be driven in unison with the vehicle and having a field circuit, means controlling said field circuit to govern the application of the output of said generator to said electrodynamic brake including a normally open switch adapted to be closed in response to movement of said brake controller away from said released position, and a second control for said field circuit including in series a manually adjustable voltage changer and a switch adapted to be closed when said accelerator is in said released position and opened when the accelerator is moved away from such position.

12. For use on a vehicle having a controller manually movable away from a released position to apply the friction brakes of the vehicle, an auxiliary braking system having, in combination, an electrodynamic brake for retarding the vehicle, a generator adapted to be driven in unison with the vehicle motion and having a winding variably energizable to vary the generator output, means for applying the output of said generator to said electrodynamic brake including a first switch, means responsive to the output voltage of said generator for maintaining said switch closed and opened respectively when the output voltage rises above and falls below a predetermined value, an energizing circuit for said generator winding including a normally open switch adapted to be closed in response to movement of said brake controller away from said released position, and a second energizing circuit for said winding including in series a manually adjustable voltage changer and a manually operable control switch.

13. For use on a vehicle having an accelerator manually movable away from a released position to increase the vehicle speed progressively and a controller manually movable away from a released position to apply the friction brakes of the vehicle, an auxiliary braking system having, in combination, an electrodynamic brake for retarding the vehicle, means on said vehicle providing a source of current for energizing said electrodynamic brake, means for applying current from said source to said electrodynamic brake including a normally open switch adapted to be closed in response to movement of said brake controller away from said released position, means providing a secondary circuit for causing energization of said electrodynamic brake from said current source including in series a manually adjustable voltage changer and a third switch adapted to be closed when said accelerator is in said released position and opened when the accelerator is moved away from such position.

14. For use on a vehicle having an accelerator manually movable away from a released position to increase the vehicle speed progressively and a controller manually movable away from a released position to apply the friction brakes of the vehicle, an auxiliary braking system having, in combination, an electrodynamic brake for retarding the vehicle, means on said vehicle providing a source of current for energizing said electrodynamic brake, means for applying current from said source to said electrodynamic brake when said brake controller is disposed out of said released position and the vehicle is traveling above a predetermined speed, an auxiliary means for causing energization of said electrodynamic brake from said source when said accelerator is disposed in said released position and the vehicle is traveling above a predetermined speed higher than said first mentioned speed, and selectively operable means for varying the action of said last mentioned energizing means whereby to vary said second vehicle speed.

15. For use on an automotive vehicle having a controller manually movable away from a released position to increase the speed of propulsion of the vehicle, a braking system having, in combination, an electrodynamic brake for said vehicle, an electric generator adapted to be driven in unison with the vehicle motion, magnetic means responsive to the output voltage of said generator and operable to apply the generator output to said brake when the voltage exceeds a predetermined value, said generator having a field winding, means providing an energizing circuit through said winding including a switch actuated by said controller so as to be closed when the controller is in said released position and open when the controller is disposed out of such position, and a variable resistance interposed in said circuit in series with said switch and said winding and selectively adjustable to vary the speed of the vehicle at which said predetermined voltage value is attained by said generator.

16. For use on an automotive vehicle having a controller manually movable away from a released position to increase the speed of propulsion of the vehicle, a braking system having, in combination, an electrodynamic brake for said vehicle, an electric generator adapted to be driven in unison with the vehicle motion, magnetic means responsive to the output voltage of said generator and operable to apply the generator output to said brake when the voltage exceeds a predetermined value, switching means governing the operation of said generator and actuated by said controller to disable said generator when the controller is out of said released position and render the generator operative when the controller is returned to released position, and a regulator selectively adjustable to modify the action of said generator and vary the vehicle speed at which said predetermined voltage is attained.

17. The combination of an electrodynamic brake for use in retarding the motion of a vehicle, an electric generator adapted to be driven in unison with the motion of the vehicle and having a field circuit, means responsive to the voltage output of said generator and operable to modify said field circuit and limit the output voltage to a predetermined value, a regulator selectively adjustable to vary said voltage limit, a speed detector responsive to the speed of said vehicle and operable when a predetermined safe maximum speed is exceeded to close said field circuit and render said brake effectual, and means also actuated by said speed detector above said maximum speed to disable said regulator.

18. In a vehicle braking system, the combination of an electrodynamic brake, a main electric generator adapted to be driven in unison with the motion of said vehicle for energizing said brake, a field winding in said main generator for controlling the output thereof, an exciter generator adapted to be driven in unison with the vehicle motion and arranged in series with the field winding of said main generator for supplying current thereto, a field winding in said exciter generator, and common variable resistor means included in series with the field windings of both said main and exciter generators for simultaneously increasing the resistance in series with said field windings.

19. In a vehicle braking system, the combination of, an electrodynamic brake, a main generator having a field winding and adapted to be driven in unison with vehicle motion for supplying current to said brake, an auxiliary generator having an exciting winding and a series winding and adapted to be driven in unison with vehicle motion for exciting said field winding, and means associated with said exciting winding for adjusting the voltage produced by said auxiliary generator, said auxiliary generator, said series winding, and said main generator field being connected in series to cause a build-up of brake current as the driving speed of said main generator increases.

20. For use on a vehicle having a controller manually movable away from a released position to apply the friction brake of the vehicle, an auxiliary braking system comprising an electrodynamic brake for retarding the vehicle, a generator adapted to be driven in unison with the vehicle motion and having a field winding, means for applying the output of said generator to said electrodynamic brake, a normally open switch actuated by movement of said friction brake controller and closed in response to movement of the latter away from said released position, and an energizing circuit for said winding controlled by said switch so as to be closed when the switch is closed and interrupted when the switch is opened and said friction brake controller is in said released position.

21. For use on a vehicle having a controller manually movable away from a released position to apply the friction brake of the vehicle, an auxiliary braking system comprising an electrodynamic brake for retarding the vehicle, means providing a source of current, a device normally disposed in an inactive position and moved to an active position in the movement of said friction brake controller away from said brake released position to apply said friction brake, and means controlled by said device for applying current from said source to energize said electrodynamic brake whenever said device is in said active position, said current applying means being ineffectual when said device is in said inactive position and said friction brake controller is in said released position.

22. For use on a vehicle having an accelerator manually movable away from a released position to increase the vehicle speed, a braking system having, in combination an electrodynamic brake for retarding said vehicle, means on said vehicle providing a source of electric current of variable voltage, means for applying current from said source to said brake to energize the same at one voltage when said accelerator is disposed in said released position and the vehicle is traveling above a predetermined speed, a device responsive to the motion of said vehicle and maintained in active and inactive positions respectively when the vehicle is traveling above and below a predetermined speed higher than said first mentioned speed, and an auxiliary means controlled by said device and operable to apply current from said source to said brake to energize the latter at a voltage higher than said first mentioned voltage when said device is in said active position, said auxiliary current applying means being maintained ineffectual when said device is in said inactive position.

JOHN GEORGE OETZEL.
JAMES A. MASON.

REFERENCES CITED

The following references are of record in the file of this patent:

UNITED STATES PATENTS

| Number | Name | Date |
|---|---|---|
| 2,395,904 | Oetzel | Mar. 5, 1946 |
| 2,412,228 | Oetzel | Dec. 10, 1946 |